US011181801B2

(12) United States Patent
Perreault et al.

(10) Patent No.: US 11,181,801 B2
(45) Date of Patent: Nov. 23, 2021

(54) BEAM STEERING OPTICS FOR VIRTUAL REALITY SYSTEMS

(71) Applicant: Google LLC, Mountain View, CA (US)

(72) Inventors: John D. Perreault, Mountain View, CA (US); Patrick Llull, San Jose, CA (US); Brion Koprowski, Mountain View, CA (US)

(73) Assignee: Google LLC, Mountain View, CA (US)

(*) Notice: Subject to any disclaimer, the term of this patent is extended or adjusted under 35 U.S.C. 154(b) by 310 days.

(21) Appl. No.: 15/889,796

(22) Filed: Feb. 6, 2018

(65) Prior Publication Data

US 2019/0243209 A1 Aug. 8, 2019

(51) Int. Cl.
*G02F 1/29* (2006.01)
*G09G 3/02* (2006.01)
*G09G 3/00* (2006.01)
*G06T 19/00* (2011.01)

(52) U.S. Cl.
CPC ............. *G02F 1/292* (2013.01); *G09G 3/007* (2013.01); *G09G 3/02* (2013.01); *G02F 2203/07* (2013.01); *G02F 2203/22* (2013.01); *G02F 2203/24* (2013.01); *G06T 19/006* (2013.01); *G09G 2340/0457* (2013.01)

(58) Field of Classification Search
CPC .. G02F 1/292; G02F 2203/07; G02F 2203/22; G02F 2203/24; G09G 3/02; G09G 3/007; G09G 2340/0457; G06T 19/006
USPC ...................................................... 349/11, 13
See application file for complete search history.

(56) References Cited

U.S. PATENT DOCUMENTS

| | | |
|---|---|---|
| 6,184,969 B1 | 2/2001 | Fergason |
| 9,335,548 B1 | 5/2016 | Cakmakci et al. |
| 9,983,413 B1 | 5/2018 | Sahlsten et al. |
| 2005/0105016 A1 | 5/2005 | Kurihara et al. |
| 2012/0113092 A1 | 5/2012 | Bar-Zeev et al. |
| 2012/0188467 A1 | 7/2012 | Escuti et al. |

(Continued)

FOREIGN PATENT DOCUMENTS

| | | |
|---|---|---|
| CN | 102317842 A | 1/2012 |
| CN | 106170729 A | 11/2016 |

(Continued)

OTHER PUBLICATIONS

International Search Report and Written Opinion dated May 17, 2019 for corresponding International Application No. PCT/US2019/015804, 13 pages.

(Continued)

*Primary Examiner* — Charles S Chang

(57) ABSTRACT

A near-eye display system includes a display panel to present image frames to the eyes of a user for viewing. The system also includes a beam steering assembly facing the display panel that is configurable to displace a light beam incident on the beam steering assembly, thereby laterally shifting light relative to an optical path of the light beam incident on the beam steering assembly. A method of operation of the near-eye display system includes configuring the beam steering assembly in a first configuration state so that the beam steering assembly displaces a light beam incident on the beam steering assembly, such that the displaced light beam is laterally shifted relative to an optical path of the light beam.

20 Claims, 5 Drawing Sheets

(56) References Cited

U.S. PATENT DOCUMENTS

| | | | |
|---|---|---|---|
| 2016/0077338 A1* | 3/2016 | Robbins | G02B 6/0016 345/8 |
| 2017/0139213 A1 | 5/2017 | Schmidtlin | |
| 2017/0176753 A1* | 6/2017 | Shi | G02F 1/137 |
| 2017/0270637 A1* | 9/2017 | Perreault | G02B 27/0172 |
| 2019/0025589 A1 | 1/2019 | Haddick | |
| 2019/0227492 A1* | 7/2019 | Kroll | G02B 27/0101 |

FOREIGN PATENT DOCUMENTS

| | | |
|---|---|---|
| JP | 08194207 A | 7/1996 |
| TW | 201300834 A | 1/2013 |
| TW | 201641990 A | 12/2016 |
| WO | 2014207457 A1 | 12/2014 |
| WO | 2018011285 A1 | 1/2018 |

OTHER PUBLICATIONS

English Translation of Taiwanese Office Action dated Oct. 31, 2019 for TW Application No. 108100486, 6 pages.

Non-Final Office Action dated Jan. 31, 2020 for U.S. Appl. No. 16/148,489, 18 pages.

English Translation of Taiwanese Office Action dated Jul. 28, 2020 for TW Application No. 108100486, 3 pages.

International Preliminary Report on Patentability dated Aug. 20, 2020 for corresponding International Application No. PCT/US2019/015804, 8 pages.

Non-Final Office Action dated May 6, 2020 for U.S. Appl. No. 16/148,489, 14 pages.

Notice of Allowance dated Feb. 5, 2021 for U.S. Appl. No. 16/148,489, 14 pages.

Final Office Action dated Oct. 19, 2020 for U.S. Appl. No. 16/148,489, 21 pages.

Non-Final Office Action dated May 28, 2021 for U.S. Appl. No. 16/148,489, 11 pages.

English Translation of Chinese Office Action dated Mar. 15, 2021 for Application No. 201980002233.6, 43 pages.

English Translation of Chinese Office Action dated Sep. 1, 2021 for Application No. 201980002233.6, 47 pages.

\* cited by examiner

BEAM STEERING OPTICS FOR VIRTUAL REALITY SYSTEMS

BACKGROUND

Head-mounted displays (HMDs) and other near-eye display systems can utilize an integral lightfield display or other computational display to provide effective display of three-dimensional (3D) graphics. Generally, the integral lightfield display employs one or more display panels and an array of lenslets, pinholes, or other optic features that overlie the one or more display panels. The HMDs and other near-eye display devices may have challenges associated with the limited pixel density of current displays. Of particular issue in organic light emitting diode (OLED)-based displays and other similar displays is the relatively low pixel fill factor; that is, the relatively large degree of "black space" between pixels of the OLED-based displays. While this black space is normally undetectable for displays having viewing distances greater than arm's length from the user, in HMDs and other near-eye displays this black space may be readily detectable by the user due to the close proximity of the display to the user's eyes. The visibility of the spacing between pixels (or sub-pixels) is often exacerbated due to magnification by the optics overlying the display panel. Therefore, there occurs a screen-door effect, in which a lattice resembling a mesh screen is visible in an image realized in the display, which typically interferes with user immersion in the virtual reality (VR) or augmented reality (AR) experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate various systems and techniques for providing optical beam steering in a near-eye display system or imaging system. As described in further detail below, a head mounted display (HMD) or other near-eye display system implements a beam steering assembly disposed between a display panel and a user's eye. The beam steering assembly can be utilized to enhance the resolution of the display panel or to compensate for the "screen-door" effect using a time-multiplexed approach to displaying a sequence of two or more images that are perceived as a higher-resolution image by the user through exploitation of the visual persistence effects of the human eye. In some implementations, the near-eye display system projects time-multiplexed images at a higher display rate such that two or more of the images having different visual information are effectively combined by the human visual perception system into a single "super-resolution" image; that is, an image with an effective resolution higher than the native resolution of the display panel. In other implementations, the near-eye display system projects two or more adjacent images having the same visual information but are spatially shifted via the beam steering apparatus relative to each other so as to be perceived by the user as an image with light emitting elements of increased apparent size, and thus effectively covering the non-emissive portions between the light emitting elements of the display.

Figure 1:
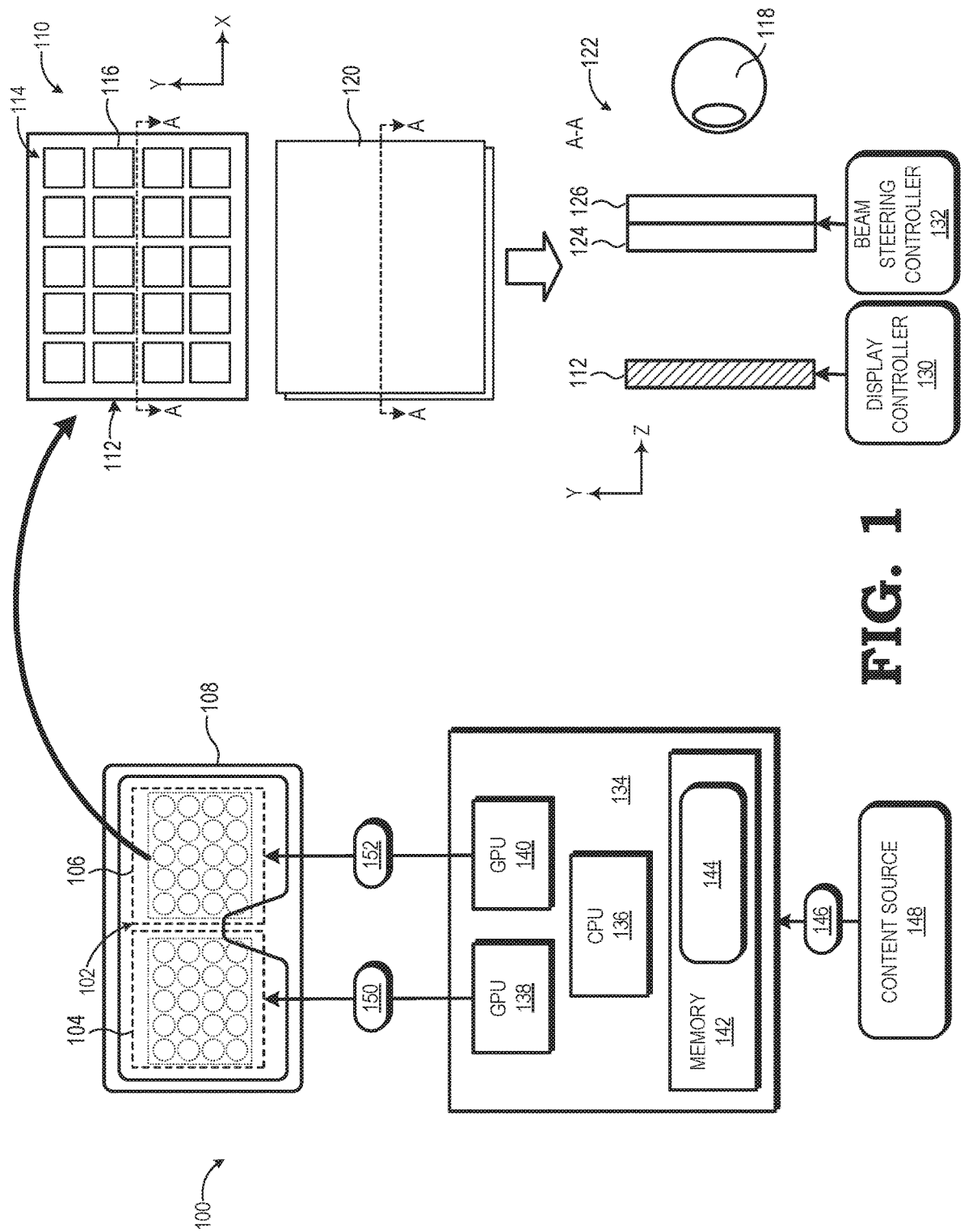
FIG. 1 is a diagram illustrating an arrangement of components of a near-eye display system utilizing a beam steering assembly to project imagery in accordance with some embodiments.

FIG. 1 illustrates a near-eye display system 100 for implementation in a head mounted device (HMD), heads-up display, or similar device in accordance with some embodiments. As depicted, the near-eye display system 100 includes a computational display sub-system 102. The near-eye display system 100 further can include other components, such as an eye-tracking subsystem, an inertial measurement unit (IMU), audio componentry, and the like, that have been omitted for purposes of clarity. The computational display sub-system 102 includes a left-eye display 104 and a right-eye display 106 mounted in an apparatus 108 (e.g., goggles, glasses, etc.) that places the displays 104, 106 in front of the left and right eyes, respectively, of the user.

As shown by view 110, each of the displays 104, 106 includes at least one display panel 112 to display a sequence or succession of near-eye images, each of which comprises an array 114 of elemental images 116. The display panel 112 is used to display imagery to at least one eye 118 of the user in the form of a normal image (e.g., for super-resolution implementations) or a lightfield (e.g., for lightfield implementations). In some embodiments, a separate display panel 112 is implemented for each of the displays 104, 106, whereas in other embodiments the left-eye display 104 and the right-eye display 106 share a single display panel 112, with the left half of the display panel 112 used for the left-eye display 104 and the right half of the display panel 112 used for the right-eye display 106.

As depicted, the near-eye display system 100 includes a beam steering assembly 120 overlying the display panel 112 so as to be disposed between the display panel 112 and the at least one eye 118 of a user. Cross view 122 depicts a cross-section view along line A-A of the beam steering assembly 120 overlying the display panel 112. The beam steering assembly 120 includes a stack of one or more optical beam steering elements, such as the two optical beam steering elements 124, 126 illustrated in FIG. 1, each optical beam steering element configured to replicate and displace incident light rays originating from the display panel 112.

The near-eye display system 100 also includes a display controller 130 to control the display panel 112 and, in some embodiments, a beam steering controller 132 to control the operation of the beam steering assembly 120. As also shown in FIG. 1, the near-eye display system 100 also includes a rendering component 134 including a set of one or more processors, such as the illustrated central processing unit (CPU) 136 and graphics processing units (GPUs) 138, 140 and one or more storage components, such as system memory 142, to store software programs or other executable instructions that are accessed and executed by the processors 136, 138, 140 so as to manipulate the one or more of the processors 136, 138, 140 to perform various tasks as described herein. Such software programs include, for example, rendering program 144 comprising executable instructions for an optical beam steering and image rendering process, as described below.

In operation, the rendering component 134 receives rendering information 146 from a local or remote content source 148, where the rendering information 146 represents graphics data, video data, or other data representative of an object or scene that is the subject of imagery to be rendered and displayed at the display sub-system 102. Executing the rendering program 144, the CPU 136 uses the rendering information 146 to send drawing instructions to the GPUs 138, 140, which in turn utilize the drawing instructions to render, in parallel, a series of image frames 150 for display at the left-eye display 104 and a series of lightfield frames 152 for display at the right-eye display 106 using any of a variety of well-known VR/AR computational/lightfield rendering processes.

As described in greater detail herein, the beam steering assembly 120 laterally displaces, or "shifts" the position of pixels in the image frames 150, 152 to fill in non-emissive portions of the display panel 112. For example, in some embodiments, the beam steering assembly 120 shifts the position of successive images displayed at the display panel 112 so as to project to the user a super-resolution image or a higher-resolution lightfield due to the succession of images effectively being superimposed due to the visual persistence effect of the human visual system. In other embodiments, the beam steering assembly 120 replicates pixels of each given image and laterally displaces the replicated pixels so as to project an image with pixels of a perceived larger size (e.g., due to increased effective pixel count) that conceals the non-emissive space between pixels. It will be appreciated that although described in the context of the near-eye display system 100, the beam steering described herein may be used for any type of VR or AR system (e.g., conventional magnifier displays, computational displays, see-through displays, and the like).

Figure 2:
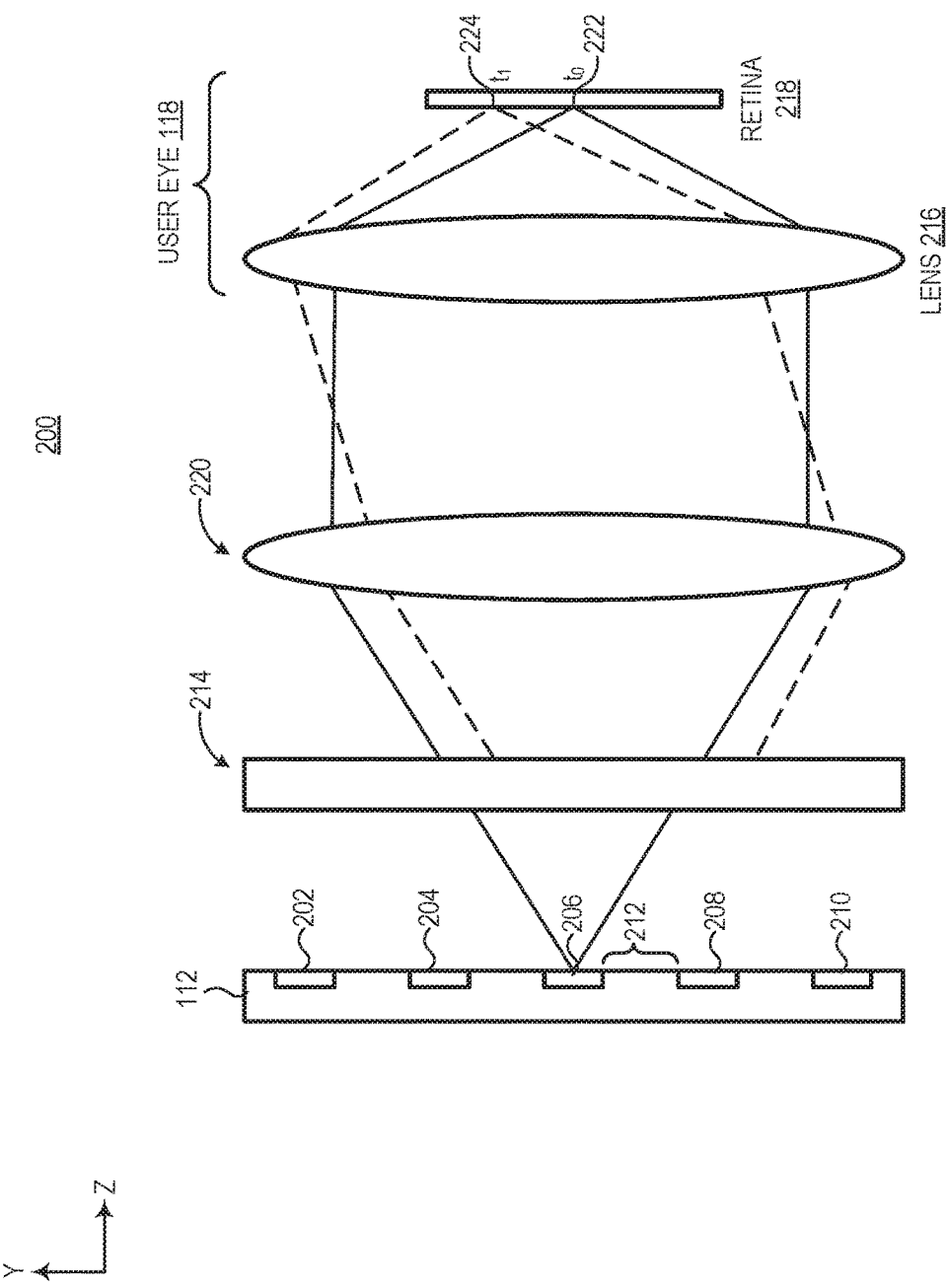
FIG. 2 is a diagram illustrating a cross-section view of an implementation of the near-eye display system of FIG. 1 for providing super-resolution imagery in accordance with some embodiments.

FIG. 2 illustrates a cross-section view of an implementation 200 of the near-eye display system 100 for providing super-resolution imagery to the eye 118 of the user in accordance with at least one embodiment of the present disclosure. In this example, the display panel 112 comprises an array of pixels, which typically are arranged as an interwoven pattern of sub-pixels of different colors, such as red, green, and blue (RGB) sub-pixels, and wherein the spatial persistence effects of human vision result in adjacent sub-pixels of different colors to be perceived as a single pixel having a color represented by a blend of the adjacent sub-pixels and their respective intensities. For ease of illustration, the display panel 112 is not depicted to scale, and is depicted as having only five sub-pixels in the cross-section (sub-pixels 202, 204, 206, 208, 210), whereas a typical display would have hundreds or thousands of sub-pixels along the cross-section, and thus it will be appreciated that the dimensions of the sub-pixels 202-210, and the non-emissive space in between the sub-pixels (e.g., non-emissive space 212 between sub-pixels 206 and 208) is significantly exaggerated relative to the other components of the implementation 200.

Further, to aid in illustration of the operation of the beam steering assembly 120, the implementation 200 of FIG. 2 illustrates the beam steering assembly 120 as having only a single optical beam steering element 214. Moreover, in FIG. 2, the user's eye 118 is depicted as a lens 216 representing the lens of the eye 118 and a panel 218 representing the retinal plane of the eye 118. As such, the panel 218 is also referred to herein as "retina 218." Further, the implementation 200 includes a magnifier lens assembly 220 (not shown in FIG. 1 for ease of illustration) overlaying the display panel 112 such as to be disposed between the optical beam steering element 214 and the eye 118 of the user. Although illustrated in FIG. 2 to be a single lens, in other embodiments, the magnifier lens assembly 220 includes a lenslet array (not shown) with each lenslet focusing a corresponding region of the display panel 112 onto the lens 216 of the eye. It also should be noted that while FIG. 2 depicts an optical configuration with a single lens and the optical beam steering element 214 between the display panel 112 and the eye 118, in a typical implementation the optical system may comprise a larger number of lenses, prisms, or other optical elements between the display panel 112 and the eye 118.

As shown, the optical beam steering element 214 is configured to replicate light originating from sub-pixel 206 and displace the replicated sub-pixel such that the eye 118 perceives the replicated sub-pixel as originating from the non-emissive space 212 between sub-pixels 206 and 208, and thus create a perception of a display having an effective resolution of approximately twice the actual resolution of the display panel 112. To illustrate, in one embodiment, the beam steering controller 132 of FIG. 1 at time to deactivates the beam steering element 214 and the display controller 130 scans in a first image for display by the display panel 112. The resulting light output by sub-pixel 206 for the first image is directed to a display-panel-facing surface of the beam steering element 214. Because the beam steering element 214 is deactivated at time $t_0$, the incident light is passed through the beam steering element 214 without lateral displacement to the user's eye 118, whereupon the lens 216 of the eye 118 focuses the light on the retina 218 at position 222 (with light from the other sub-pixels 202-204 and 208-210 taking corresponding paths).

Subsequently, at time $t_1$, the beam steering controller 132 of FIG. 1 activates the beam steering element 214, which configures the beam steering element 214 to laterally displace incident light (e.g., two-dimensional shift of incident light in the X- and/or Y-axis directions of FIG. 2). The display controller 130 scans in a second image for display by the display panel, and the resulting light output by sub-pixel 206 for the second image is directed to the display-panel-facing surface of the beam steering element 214. Because the beam steering element 214 is activated at time $t_1$, the incident light is laterally displaced after passing through the beam steering element 214. The laterally-displaced light is passed to the user's eye 118, whereupon the lens 216 of the eye 118 focuses the light on the retina 218 at position 224. The eye 118 perceives light at position 224 as originating from the non-emissive space 212 between sub-pixels 206 and 208 (although the light actually originated from sub-pixel 206). The lateral displacement of incident light at the beam steering element 214 results in presenting sub-pixels of the second image at positions where non-emissive spaces would have been perceived as black space by the eye 118 from the display of the first image at time $t_0$. Thus, if the first image at time to and the second image at time $t_1$ are displayed in quick succession (i.e., within the visual persistence interval of the human eye, which is approximately 10 ms), the human visual system perceives the first and second images to be overlapping. That is, in this example, the lateral displacement introduced to the light of the second image has the result of presenting the sub-pixels of the second image where black spaces would have appeared to the eye 118 from the display of the first image, and thus the sub-pixels of the second image appear to the eye 118 to occupy black spaces associated with non-emissive portions of the display panel 112 for the first image.

The second image at time $t_1$, in some embodiments, has the same visual content as the first image at time $t_0$. In such embodiments, the eye 118 perceives the two images as overlapping in a single image of the same resolution of the first and second images (i.e., at native resolution of the display panel 112) but with larger perceived pixels that fill in the black space associated with non-emissive portions of the display panel 112, and thus reduce or eliminate the screen-door effect that would otherwise be visible to the eye 118. In other embodiments, the second image at time $t_1$ has different visual content than the first image at time $t_0$. In such embodiments, the eye 118 perceives the two images as overlapping in a single super-resolution image with visual content of the second image filling in the black space associated with non-emissive portions of the display panel 112. This reduces or eliminates the user's ability to perceive these non-emissive portions of the display panel 112, thereby creating a perception of a display having an effective resolution of approximately twice the actual resolution of the display panel 112.

It should be noted that although the implementation 200 of the near-eye display system 100 in FIG. 2 depicts a beam steering assembly having a single beam steering element 214 for lateral light displacement, as noted above the beam steering assembly 120 may employ a stack of multiple beam steering elements (e.g., beam steering elements 124, 126 of FIG. 1) of differing configurations so as to provide multiple different lateral displacements, and thus provide the option to shift multiple successive images in different directions. For example, assuming the stack uses beam steering elements having a replication factor of two (e.g., beam steering element 214 of FIG. 2 that passes incident light to two different locations as either laterally displaced or not laterally displaced based on two corresponding states of the beam steering element 214, activated or deactivated), a stack of four beam steering elements allows for the replication and steering of each sub-pixel of the display panel to four different positions (i.e., three laterally displaced positions plus one original sub-pixel position in which all four beam steering elements are deactivated so that light passes through without any lateral displacement).

It should further be noted that although the example of FIG. 2 is described in the context of a beam steering element 214 having a replication factor of two (i.e., deactivated to pass through without any lateral displacement or activated to replicate a sub-pixel for shifting to another position), other embodiments may employ beam steering elements having multiple different states. For example, instead of using a stack of four beam steering elements that each have a replication factor of two, a single beam steering element (not shown) having a replication factor of four may be controlled by beam steering controller 132 of FIG. 1 to switch between four different states that allow for the replication and steering of each sub-pixel of the display panel to four different positions (i.e., three laterally displaced positions plus one original sub-pixel position in which all four beam steering elements are deactivated so that light passes through without any lateral displacement).

In some embodiments, an amount of screen door effect perception (i.e., metric of screen door effect severity) is represented by the equation: MTF(u)*CSF(u) for all spatial frequencies u, where MTF represents a Modulation Transfer Function specifying how different spatial frequencies are handled by the optics of a system (e.g., the near-eye display system 100) and CSF represents a Contrast Sensitivity Function representing the eye's ability to discern between luminances of different levels in a static image. The product of eye's contrast sensitivity (i.e., how sensitive the eye is to certain spatial frequencies, which turns out to be very sensitive to screen door frequency) and the spatial frequency content of pattern produced with replication provides a system transfer function in which the larger the transfer function is (for that specific spatial frequency u), the more screen door will be perceived. Accordingly, reduction of the system transfer function can be represented by an optimization metric as provided by equation (1) below:

$$\min_{d,\theta} \frac{\int_{u_{min}}^{u_{max}} PTF(u, d, \theta) CSF(u) du}{\int_{u_{min}}^{u_{max}} PTF(u, 0, 0) CSF(u) du} \qquad (1)$$

where u represents spatial frequency, d represents possible lateral displacement between replication spots, and $\theta$ represents rotation of replication/beam steering elements. The product of the equation provides a metric of how much screen door effect is perceivable after stacking a number N of beam steering elements. For example, based on equation (1) for a beam steering element (which can also be referred to as a "filter") having a replication factor of two (such as described herein with respect to FIG. 2), one filter results in approximately 41% perceptibility of the screen door effect, two filters results in approximately 14% perceptibility of the screen door effect, three filters results in approximately 7.5% perceptibility of the screen door effect, and four filters results in approximately 3.1% perceptibility of the screen door effect. Accordingly, increasing the number of beam steering elements in a stack for the beam steering assembly generally reduces perceptibility of the screen door effect.

Figure 3:
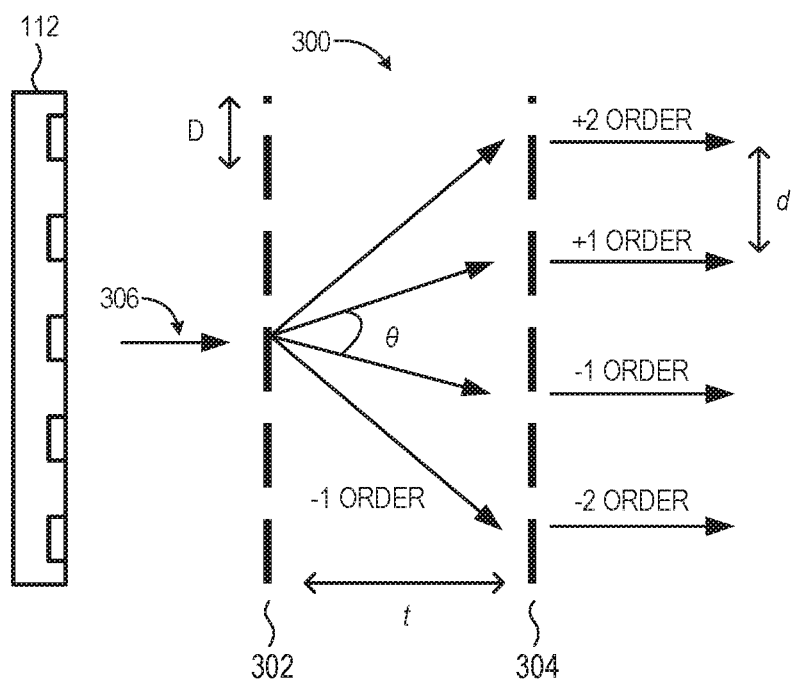
FIG. 3 is a diagram illustrating a diffractive beam steering element for use in the near-eye display system of FIG. 1 in accordance with some embodiments.

The beam steering assembly is implementable using any of a variety of suitable optical beam steering elements capable of sub-pixel-scale steering (i.e., steer replicated sub-pixels between positions based on states of the beam steering element). For example, FIG. 3 is a diagram illustrating a diffractive beam steering element in accordance with some embodiments. In the example of FIG. 3, a beam steering element 300 (e.g., one of the beam steering elements 124, 126 of FIG. 1 or beam steering element 214 of FIG. 2) is a stacked pair of gratings including a first grating 302 and a second grating 304 that splits and diffracts incident light into several beams traveling in different directions.

In some embodiments, the relationship between grating spacing and the angles of the incident and diffracted beams of light for beam steering element 300 is represented by equations (2) and (3):

$$\theta = \sin^{-1}\frac{n\lambda}{D}, \qquad (2)$$

$$t = \frac{d}{\tan\theta}, \quad (3)$$

where θ represents the diffractive angle between beams of diffracted light (i.e., angular deflection of the diffracted beam, n represents the order number, λ represents the wavelength of incident light, D represents the period of the gratings, t represents the distance between the gratings, and d represents the optical lateral displacement between the replicated sub-pixels. As discussed in more detail relative to FIG. 2, the lateral displacement distance d is less than a pixel to fill in the non-emissive portions between sub-pixels.

As shown, the first grating 302 of beam steering element 300 diffracts an incident beam of light 306 (e.g., light from a sub-pixel of the display panel) into the ±1 first orders. The second grating 304 of the grating pair further diffracts the light beams of ±1 first orders into the ±2 second orders and reverses the angular deflection of the diffracted beams such that light beams passing through the second grating 304 (and therefore leaving the beam steering element 300) has a direction matching the incidence angle of the incident beam of light 306 from sub-pixels of the display panel. In this manner, the beam steering element 300 replicates the original incident beam of light 306 and laterally displaces the replicated beams. Various amplitude or phase gratings may be utilized for diffracting the incident light beam and then reversing the angular deflection without departing from the scope of this disclosure. Further, the gratings may be designed for single or multiple diffraction orders to reduce thickness of the beam steering element.

In some embodiments, the relative spot intensities (i.e. diffraction efficiency) of spots (e.g., replicated beams of light) replicated by beam steering element 300 is represented by equation (4):

$$\sin c(n*w/D)^2 \quad (4)$$

where n represents diffraction order number, w/D is the open fraction of the grating, and $\sin c(x) = \sin(\pi*x)/(\pi*x)$. Accordingly, the intensity of the replicated spots may be adjusted based on the open fraction of gratings in beam steering element 300.

Figure 4:
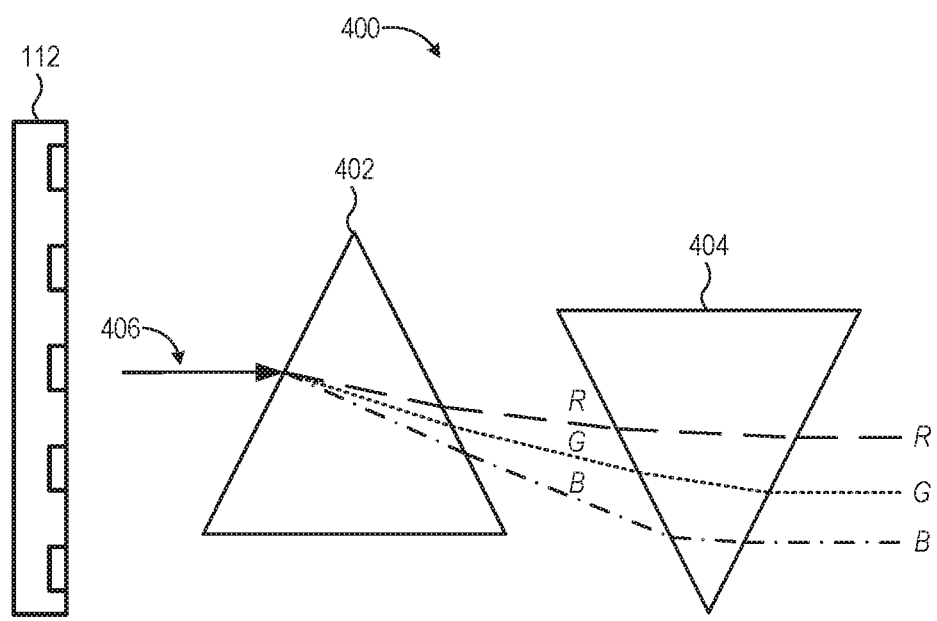
FIG. 4 is a diagram illustrating a refractive beam steering element for use in the near-eye display system of FIG. 1 in accordance with some embodiments.

In another embodiment, FIG. 4 is a diagram illustrating a refractive beam steering element in accordance with some embodiments. In the example of FIG. 4, a beam steering element 400 (e.g., one of the beam steering elements 124, 126 of FIG. 1 or beam steering element 214 of FIG. 2) is a stacked pair of prisms including a first prism 402 and a second prism 404 that refracts incident light into several beams traveling in different directions. As shown, the first prism 402 angularly disperses an incident beam of white light 406 from the display panel 112 into three angularly-deviated rays. As the refractive index of prisms varies with the wavelength (i.e., color) of light, rays of different colors will be refracted differently and leave the first prism 402, thereby separating the incident beam of white light 406 into red, green, and blue rays. The red ray R has a longer wavelength than the green ray G and the blue ray B, and therefore leaves the first prism 402 with less angular deviation relative to the incident beam of white light 406 than the other rays. Similarly, the green ray G has a longer wavelength than the blue ray B, and therefore leaves the first prism 402 with less angular deviation relative to the incident beam of white light 406 than the blue ray B.

As shown, the second prism 404 receives the three angularly-deviated rays from the first prism 402 and reverses the angular deviations such that the rays leaving the second prism 404 (and therefore leaving the beam steering element 400) have red, green, and blue colored rays displaced laterally while having a direction matching the incidence angle of the incident beam of white light 406. In this manner, the beam steering element 400 spreads out or changes the location of pixels at a sub-pixel scale.

Figure 5:
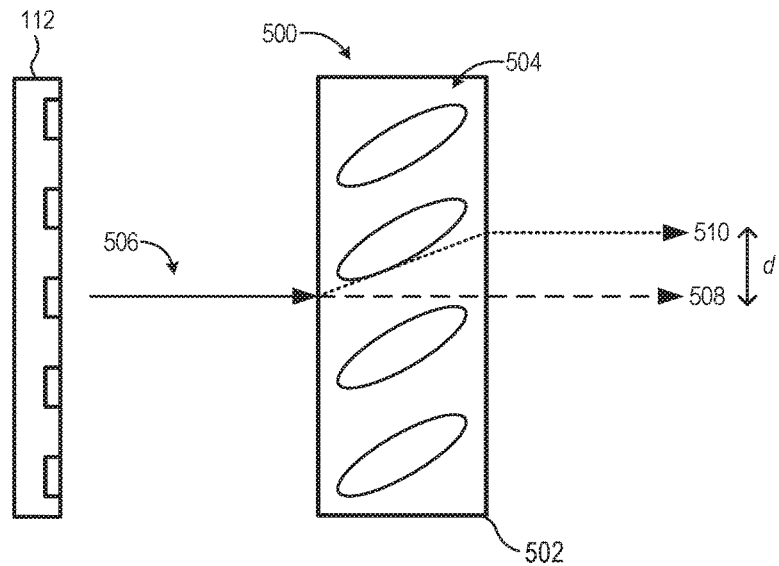
FIG. 5 a diagram illustrating another refractive beam steering element for use in the near-eye display system of FIG. 1 in accordance with some embodiments.

FIG. 5 a diagram illustrating another refractive beam steering element in accordance with some embodiments. In the example of FIG. 5, a beam steering element 500 (e.g., one of the beam steering elements 124, 126 of FIG. 1 or beam steering element 214 of FIG. 2) includes a liquid crystal cell 502 having liquid crystal molecules 504 oriented such as to form a birefringent material having a refractive index that depends on the polarization and propagation direction of light. As shown, the liquid crystal molecules 504 are oriented to have their symmetry axes at 45 degrees relative to the substrate plane. Accordingly, due to the double refraction phenomenon whereby a ray of incident light is split based on polarization into two rays taking slightly different paths, an incident beam of unpolarized light 506 is split into two rays 508, 510 and steered to one of two deflection angles, depending on polarization state.

For the incident beam of unpolarized light 506, a first ray 508 having a first polarization state (e.g., light whose polarization is perpendicular to the optic axis of the liquid crystal cell 502, referred to as "ordinary axis oriented") passes through the liquid crystal cell 502 without deflection. The second ray 510 having a second polarization state (e.g., light whose polarization is in the direction of the optic axis of the liquid crystal cell 502, referred to as "extraordinary axis oriented") is deflected and is passed with a lateral displacement d.

In some embodiments, the beam steering element 500 includes liquid crystal molecules 504 that are oriented as illustrated in FIG. 5 and polymerized such that the liquid crystal molecules 504 are linked to be static in that configuration, thereby forming a beam replication assembly. In other embodiments, the beam steering element 500 further includes a polarization switch (not shown) stacked on top of the polymerized liquid crystal cell that switches polarization between two values so that the liquid crystal molecules 504 only received polarized light (rather than the beam of unpolarized light 506 illustrated in FIG. 5). Accordingly, depending on the polarization of incident light, the incoming polarized light is either passed through or deviated (rather than passing both rays 508, 510 as illustrated in FIG. 5).

It should be noted that while embodiments implementing various beam steering elements (such as the beam steering elements of FIG. 3-5) are described herein for illustrative purposes, other suitable beam steering elements capable of lateral (i.e., not angular) sub-pixel shifts may be implemented in place of the beam steering elements described herein unless otherwise noted.

Figure 6:
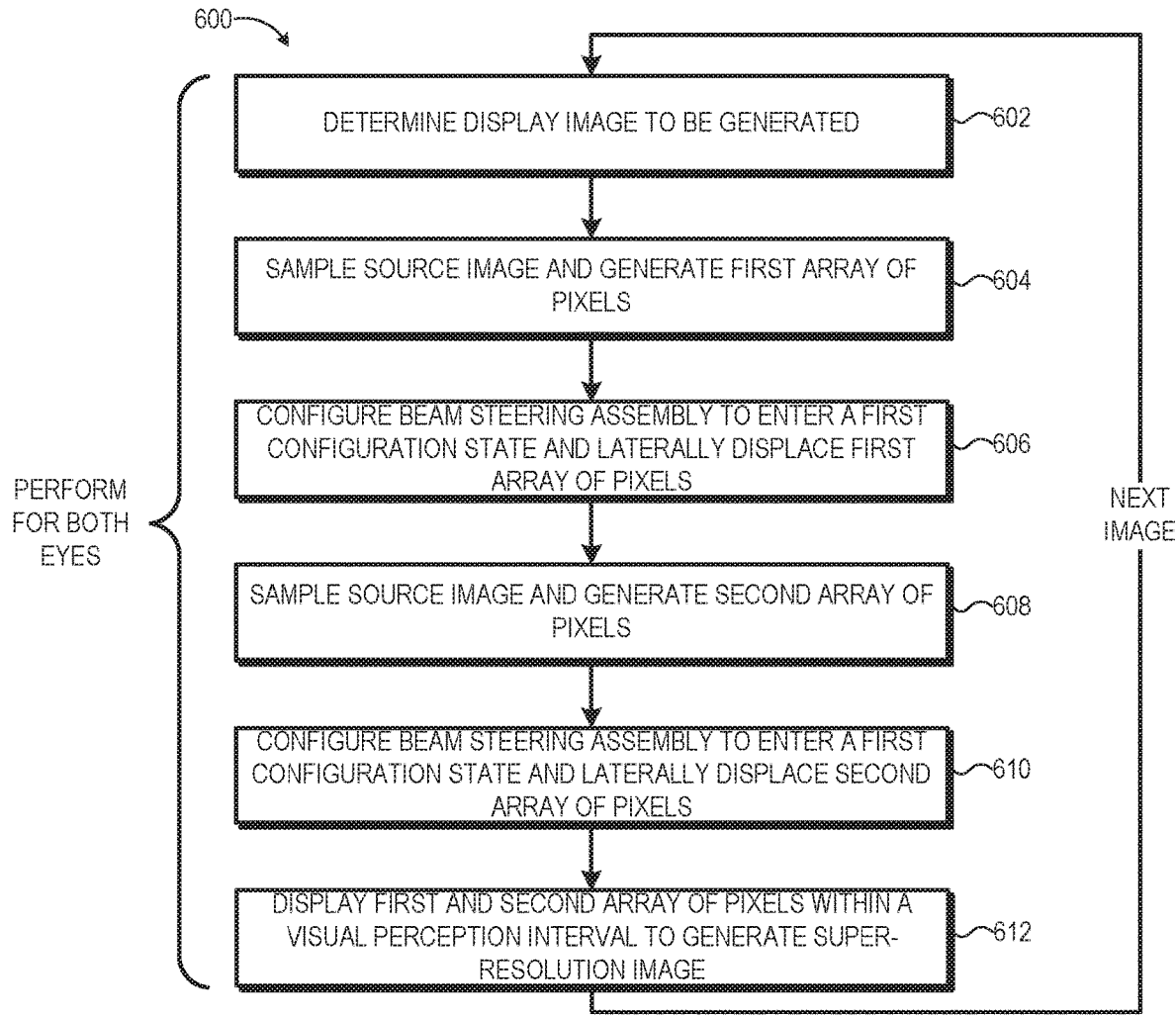
FIG. 6 is a flow diagram illustrating a method for sequential display of images to provide a super-resolution image display in the near-eye display system of FIG. 1 in accordance with some embodiments.

FIG. 6 illustrates an example method 600 of operation of the near-eye display system 100 for display of super-resolution imagery in accordance with various embodiments. As described above relative to FIGS. 1-2, the near-eye display system 100 takes advantage of the visual persistence effect to provide a time-multiplex display of shifted imagery so that either a series of images is perceived by the user as either a single super-resolution image or a native-resolution image with effectively larger pixels that conceal the non-emissive portions of the display panel 112. The method 600 illustrates one iteration of the process for rendering and displaying an image for one of the left-eye display 104 or right-eye display 106, and thus the illustrated process is repeatedly performed in parallel for each of the displays 104, 106 to generate and display a different stream or sequence of frames for each eye at different points in time, and thus provide a 3D, autostereoscopic VR or AR experience to the user.

The method 600 initiates at block 602 with determining a display image to be generated and displayed at the display panel 112. In some embodiments, the rendering component 134 identifies the image content to be displayed to the corresponding eye of the user as a frame. In at least one embodiment, the rendering component 134 receives pose data from various pose-related sensors, such as a gyroscope, accelerometer, magnetometer, Global Positioning System (GPS) sensor, and the like to determines a current pose of the apparatus 108 (e.g., HMD) used to mount the displays 104, 106 near the user's eyes. From this pose data, the CPU 136, executing the rendering program 144, can determine a corresponding current viewpoint of the subject scene or object, and from this viewpoint and graphical and spatial descriptions of the scene or object provided as rendering information 146, determine the imagery to be rendered.

At block 604, the rendering program 144 manipulates the CPU 136 to sample the source image and generate a first array of pixels representing imagery to be rendered (e.g., as determined in block 602). The generated first array of pixels is subsequently transmitted to the display panel 112 to be displayed.

At block 606, the beam steering controller 132 configures the beam steering assembly 120 to be in a first configuration state while the display controller 130 controls the display panel 112 facing the beam steering assembly 120 to display the first array of pixels generated in block 604. In some embodiments, such as described above relative to time to in FIG. 2, the first configuration state of the beam steering assembly is a deactivated state in which the optical beam steering element 214 allows the first array of pixels to be passed without any lateral displacements. In other embodiments, the first configuration state of the beam steering assembly laterally displaces the first array of pixels such that they are not laterally aligned with the original optical path between the display panel 112 and the beam steering assembly 120. Accordingly, the beam steering assembly, while in the first configuration state, imparts a first lateral displacement to the first array of pixels.

As explained above, for various beam steering devices, the switching between configuration states for the beam steering assembly typically includes activating or deactivating a particular combination of stages of the stack of beam steering elements comprising the beam steering assembly, such that the array of pixels leaving the beam steering assembly is laterally shifted based on the configuration state. Note that the process of block 606 may be performed concurrently with the corresponding image generation at block 604.

At block 608, the rendering program 144 manipulates the CPU 136 to sample the source image and generate a second array of pixels representing imagery to be rendered (e.g., as determined in block 602). The generated second array of pixels is subsequently transmitted to the display panel 112 to be displayed.

At block 610, the beam steering controller 132 configures the beam steering assembly 120 to be in a second configuration state while the display controller 130 controls the display panel 112 facing the beam steering assembly 120 to display the second array of pixels generated in block 608. In some embodiments, such as described above relative to time $t_1$ in FIG. 2, the second configuration state of the beam steering assembly is an activated state in which the optical beam steering element 214 laterally displaces the second array of pixels such that they are not laterally aligned with first array of pixels.

As explained above, for various beam steering devices, the switching between configuration states for the beam steering assembly typically includes activating or deactivating a particular combination of stages of the stack of beam steering elements comprising the beam steering assembly, such that the array of pixels leaving the beam steering assembly is laterally shifted based on the configuration state. Note that the process of block 608 may be performed concurrently with the corresponding image generation at block 610.

At block 612, the display controller 130 instructs the display panel to display the first and second array of pixels (e.g., as generated from blocks 604-610) within a visual perception interval so that the first and second first and second array of pixels are perceived by a user to be a single image with an effective resolution that is higher than a native resolution of the display panel 112, thereby presenting a super-resolution image.

It should be noted that although the method 600 of FIG. 6 is described in the context of only combining two arrays of pixels that are laterally shifted to each other to generate a super-resolution image, those skilled in the art will recognize that the number and rate of iterations of the processes of blocks 604-610 may be varied increase the number of laterally shifted images to be displayed by display panel 112 during the visual persistence interval of the human eye. For example, assuming the beam steering assembly 120 includes a stack of multiple different beam steering elements (e.g., beam steering elements 124, 126 of FIG. 1) with different configuration states, the processes of blocks 604-608 are repeated for each of the different configuration states so that multiple arrays of pixels that are laterally shifted relative to each other may be generated and displayed so as to be perceived as a single super-resolution image by the user. Alternatively, rather than resampling the source image between each lateral displacement of pixels, the same array of pixels can be shifted across the various configuration states and displayed so as to be perceived as a single standard-resolution image with reduced screen-door effect by the user.

As demonstrated above, the various optical beam steering assemblies described may be advantageously used to leverage the visual persistence effect of the human visual system to provide dynamically time-multiplexed, spatially shifted images that are perceived by a user as super-resolution images or native-resolution images with reduced perception of non-emissive portions of the display. Additionally, in other embodiments, the optical beam steering assemblies described may be used to passively replicate (i.e., without sending control voltages and changing states of the beam steering assemblies) and spatially shift incident light beams coming from the display panel to provide native-resolution images with reduced perception of non-emissive portions of the display.

Figure 7:
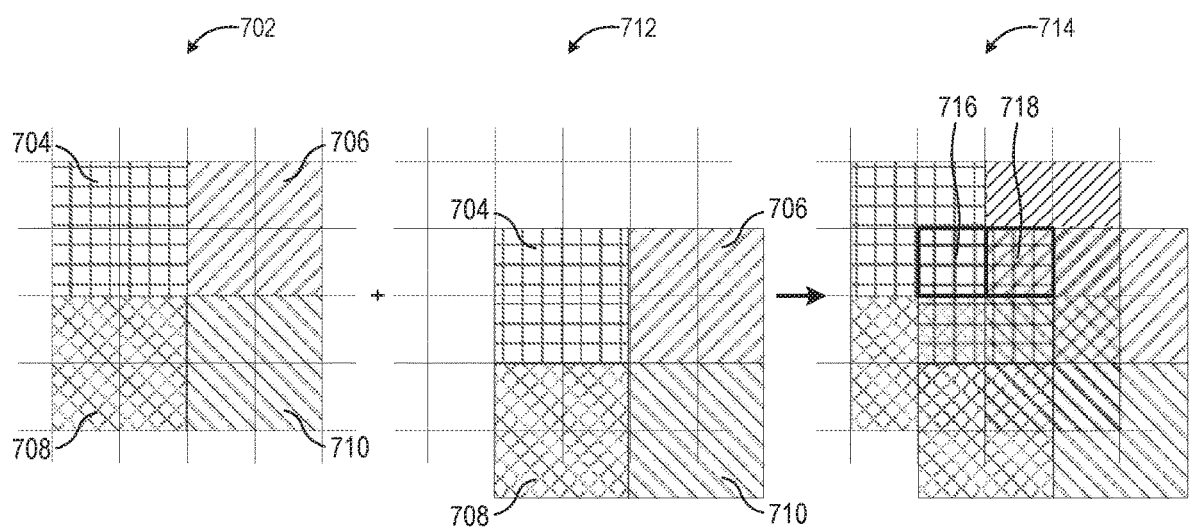
FIG. 7 is a diagram illustrating a method of generating passive super-resolution images in accordance with some embodiments.

It will be appreciated that other embodiments provide for passive super-resolution without any time-multiplexing of images. FIG. 7 is a diagram illustrating a method of generating passive super-resolution images in accordance with some embodiments. As shown, a first image 702 includes a plurality of pixels (with only four pixels 704, 706, 708, 710 shown for ease of illustration). A second image 712 provides the same content data (e.g., pixels 704, 706, 708, 710) as the first image 702, but is laterally shifted in position relative to the first image 702.

For example, in some embodiments, the first image 702 and the second image 712 are generated by presenting unpolarized light from a display screen to the beam steering element 500 of FIG. 5. For the incident unpolarized light, a first set of light rays having a first polarization state (e.g., light whose polarization is perpendicular to the optic axis of the beam steering element 500) passes through without deflection, thereby providing the first image 702. Additionally, for the same incident unpolarized light, a second set of light rays having a second polarization state (e.g., light whose polarization is in the direction of the optic axis of the beam steering element 500) is deflected and passed through with a lateral displacement d of a sub-pixel distance. In this example, the lateral displacement d is half a pixel in the x-axis direction and half a pixel in the y-axis direction, thereby diagonally shifting each of the pixels by half a pixel for the second image 712.

The first image 702 is overlaid with one or more sub-pixel shifted copies of itself (e.g., the second image 712) to generate a summed image 714 which is perceivable as having improved resolution relative to that of the first image 702 and the second image 712. It will be appreciated that depending on the overlap, certain sub-pixel portions of the summed image 714 gets contributions from the same pixel value. For example, the sub-pixel portion 716 provides image data that is provided only by the value of pixel 704. Other sub-pixel portions of the summed image 714 gets contributions from multiple different pixel values. For example, the sub-pixel portion 716 provides image data that is provided by both the values of pixel 704 and pixel 706. In this manner, the effective resolution of the perceived image (i.e., summed image 714) is increased without requiring time-multiplexing of images or coordinating the rendering of images with varying the states of beam steering elements.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A near-eye display system, comprising:
a display panel; and
a beam steering assembly facing the display panel, the beam steering assembly configurable in a plurality of configuration states to displace a light beam incident on the beam steering assembly, wherein at least one configuration state of the plurality of configuration states replicates the light beam into a plurality of laterally shifted beams relative to an optical path of the light beam, and wherein each of the plurality of laterally shifted beams includes a different lateral shift.

2. The near-eye display system of claim 1, wherein:
the beam steering assembly comprises a stacked grating pair configured to diffract the light beam, wherein a first grating of the stacked grating pair facing the display panel splits the light beam incident on the beam steering assembly into two or more angularly deflected light beams, and further wherein a second grating of the stacked grating pair angularly deflects each of the two or more angularly deflected light beams to be parallel to the optical path of the light beam incident on the beam steering assembly.

3. The near-eye display system of claim 1, wherein:
the beam steering assembly comprises a stacked prism pair configured to refract the light beam, wherein a first prism of the stacked prism pair receives the light beam from the display panel and angularly disperses the light beam into a plurality of color separated rays, and further wherein a second prism of the stacked prism pair angularly deflects each of the plurality of color separated rays to be parallel to the optical path of the light beam incident on the beam steering assembly.

4. The near-eye display system of claim 1, wherein:
the beam steering assembly comprises a liquid crystal cell configured to laterally shift the light beam incident on the beam steering assembly based on a polarization state of the light beam.

5. The near-eye display system of claim 1, further comprising:
a display controller coupled to the display panel, the display controller to drive the display panel to display a sequence of images; and
a beam steering controller coupled to the beam steering assembly, the beam steering controller to control the beam steering assembly to impart a different lateral shift for each displayed image of the sequence of images.

6. The near-eye display system of claim 5, wherein:
the sequence of images is displayed in a period of time less than a visual persistence interval so that the sequence of images is perceived by a user as a single image having an effective resolution higher than a native resolution of the display panel.

7. The near-eye display system of claim 5, wherein:
the sequence of images includes two or more images having the same visual content and which are displayed in a period of time less than a visual persistence interval so that the sequence of images is perceived by a user as a single image having a resolution of the display panel and having pixels with an apparent size that is larger than an actual size of the pixels of the display panel.

8. The near-eye display system of claim 5, wherein:
the beam steering assembly comprises a stack of beam steering elements, each beam steering elements configurable to impart a corresponding lateral shift to a pixel grid for each image of the sequence of images so that each image of the sequence of images is perceptible as a single image comprising a plurality of shifted pixel grids and having pixels with an apparent size that is larger than an actual size of the pixels of the display panel.

9. The near-eye display system of claim 1, wherein:
the beam steering assembly comprises a stack of beam steering elements, each beam steering elements configurable to impart a corresponding lateral shift to the light beam incident on the beam steering assembly when each beam steering element is activated.

10. The near-eye display system of claim 1, wherein the beam steering assembly comprises a beam steering element configurable in multiple configuration states of the plurality of configuration states, wherein each of the multiple configuration states includes a different lateral shift of the light beam relative to the optical path of the light beam.

11. In a near-eye display system, a method comprising:
configuring a beam steering assembly in at least one of a plurality of configuration states so that the beam steering assembly displaces a light beam incident on the beam steering assembly by laterally shifting the light beam relative to an optical path of the light beam, wherein a first configuration state of the plurality of configuration states replicates the light beam into a plurality of laterally shifted beams, and wherein each of the plurality of laterally shifted beams includes a different lateral shift.

12. The method of claim 11, further comprising:
controlling a display panel facing the beam steering assembly to display a first image while the beam steering assembly is in the first configuration state; and
controlling the beam steering assembly to impart a first lateral shift for the first image.

13. The method of claim 12, further comprising:
controlling the display panel facing the beam steering assembly to display a second image; and
signaling the beam steering assembly to enter a second configuration state of the plurality of configuration states to impart a second lateral shift for the second image.

14. The method of claim 13, further comprising:
controlling the display panel to display the first and second images within a visual perception interval so that the first and second images are perceptible a single image with an effective resolution that is higher than a native resolution of the display panel.

15. The method of claim 13, wherein:
the first and second images contain the same visual content and which are displayed in a period of time less than a visual persistence interval so that the first and second images are perceptible as a single image having a resolution of the display panel and having pixels with an apparent size that is larger than an actual size of the pixels of the display panel.

16. The method of claim 11, further comprising:
passing the plurality of laterally shifted beams for display so that the plurality of laterally shifted beams are perceptible as a single image having a resolution of a display panel facing the beam steering assembly and having pixels with an apparent size that is larger than an actual size of the pixels of the display panel.

17. A rendering system, comprising:
at least one processor;
a beam steering assembly facing a display panel; and
a storage component to store a set of executable instructions, the set of executable instructions configured to manipulate the at least one processor to sample a source image to render a first image comprising a first array of pixels, the set of executable instructions further to configure the beam steering assembly in at least one of a plurality of configuration states so that the first array of pixels are laterally shifted relative to an optical path between the display panel and the beam steering assembly prior to presentation to a user, wherein at least one configuration state of the plurality of configuration states replicates the first array of pixels into a plurality of laterally array of pixels.

18. The rendering system of claim 17, wherein the set of executable instructions are further configured to manipulate the at least one processor to:
resample the source image to render a second image comprising a second array of pixels; and
signal a display controller coupled to the display panel to present both the first image and the second image in a period of time less than a visual persistence interval so that the first and second array of pixels are perceptible as a single image.

19. The rendering system of claim 18, wherein the set of executable instructions are further configured to manipulate the at least one processor to:

render the first image and the second image to contain different visual content so that the single image is perceptible as having an effective resolution higher than a native resolution of the display panel.

20. The rendering system of claim 18, wherein the set of executable instructions are further configured to manipulate the at least one processor to:
   render the first image and the second image to contain the same visual content so that the single image is perceptible as having a resolution of the display panel and having pixels with an apparent size that is larger than an actual size of the pixels of the display panel.

* * * * *